(12) United States Patent
Thompson, Sr. et al.

(10) Patent No.: US 9,175,208 B2
(45) Date of Patent: Nov. 3, 2015

(54) COMPOSITIONS AND METHODS FOR BREAKING HYDRAULIC FRACTURING FLUIDS

(71) Applicant: CLEARWATER INTERNATIONAL, LLC, Houston, TX (US)

(72) Inventors: Joseph E. Thompson, Sr., Houston, TX (US); Sarkis R. Kakadjian, Houston, TX (US); Jose L. Garza, Kingwood, TX (US); Frank Zamora, Ft. Worth, TX (US)

(*) Notice: Subject to any disclaimer, the term of this patent is extended or adjusted under 35 U.S.C. 154(b) by 0 days.

(21) Appl. No.: 14/328,853

(22) Filed: Jul. 11, 2014

(65) Prior Publication Data
US 2014/0318795 A1 Oct. 30, 2014

Related U.S. Application Data

(62) Division of application No. 12/758,466, filed on Apr. 12, 2010, now Pat. No. 8,835,364.

(51) Int. Cl.
 *C09K 8/68* (2006.01)
 *C09K 8/66* (2006.01)
 *E21B 43/26* (2006.01)

(52) U.S. Cl.
 CPC ............... *C09K 8/665* (2013.01); *C09K 8/685* (2013.01); *E21B 43/26* (2013.01); *C09K 2208/26* (2013.01)

(58) Field of Classification Search
None
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |

(Continued)

FOREIGN PATENT DOCUMENTS

| CA | 2125513 | 1/1995 | |
|---|---|---|---|
| DE | 4027300 | 5/1992 | B01D 53/14 |

(Continued)

*Primary Examiner* — John J Figueroa
(74) *Attorney, Agent, or Firm* — Robert W Strozier (57) ABSTRACT

Breaking compositions are disclosed for controlled breaking of borate cross-linked fracturing fluids, and to method for making and using same, where the composition includes an oxidative component and an ester component.

21 Claims, 3 Drawing Sheets

Rheology of 30# Borate Gel System @ 200°F

(56) References Cited

U.S. PATENT DOCUMENTS

| | | | | |
|---|---|---|---|---|
| 4,385,935 A | 5/1983 | Skyeldal | | 106/607 |
| 4,461,716 A | 7/1984 | Barbarin et al. | | 252/307 |
| 4,479,041 A | 10/1984 | Fenwick et al. | | 200/81 R |
| 4,506,734 A | 3/1985 | Nolte | | 166/308.1 |
| 4,514,309 A | 4/1985 | Wadhwa | | 507/211 |
| 4,541,935 A | 9/1985 | Constien et al. | | 507/225 |
| 4,549,608 A | 10/1985 | Stowe et al. | | 166/280.1 |
| 4,561,985 A | 12/1985 | Glass, Jr. | | 507/108 |
| 4,623,021 A | 11/1986 | Stowe | | 166/250.1 |
| 4,654,266 A | 3/1987 | Kachnik | | 428/403 |
| 4,657,081 A | 4/1987 | Hodge | | 166/380.5 |
| 4,660,643 A | 4/1987 | Perkins | | 166/283 |
| 4,683,068 A | 7/1987 | Kucera | | 507/201 |
| 4,686,052 A | 8/1987 | Baranet et al. | | 507/244 |
| 4,695,389 A | 9/1987 | Kubala | | 507/244 |
| 4,705,113 A | 11/1987 | Perkins | | 166/302 |
| 4,714,115 A | 12/1987 | Uhri | | 166/308.1 |
| 4,718,490 A | 1/1988 | Uhri | | 166/281 |
| 4,724,905 A | 2/1988 | Uhri | | 166/250.1 |
| 4,725,372 A | 2/1988 | Teot et al. | | 507/129 |
| 4,739,834 A | 4/1988 | Peiffer et al. | | 166/308.4 |
| 4,741,401 A | 5/1988 | Walles et al. | | 166/300 |
| 4,748,011 A | 5/1988 | Baize | | 423/228 |
| 4,779,680 A | 10/1988 | Sydansk | | 166/300 |
| 4,795,574 A | 1/1989 | Syrinek et al. | | 507/238 |
| 4,817,717 A | 4/1989 | Jennings, Jr. et al. | | 166/278 |
| 4,830,106 A | 5/1989 | Uhri | | 166/250.1 |
| 4,846,277 A | 7/1989 | Khalil et al. | | 166/280.1 |
| 4,848,468 A | 7/1989 | Hazlett et al. | | 166/300 |
| 4,852,650 A | 8/1989 | Jennings, Jr. et al. | | 166/250.1 |
| 4,869,322 A | 9/1989 | Vogt, Jr. et al. | | 166/280.1 |
| 4,892,147 A | 1/1990 | Jennings, Jr. et al. | | 166/280.2 |
| 4,926,940 A | 5/1990 | Stromswold | | 166/247 |
| 4,938,286 A | 7/1990 | Jennings, Jr. | | 166/280.1 |
| 4,978,512 A | 12/1990 | Dillon | | 423/226 |
| 5,005,645 A | 4/1991 | Jennings, Jr. et al. | | 166/280.1 |
| 5,024,276 A | 6/1991 | Borchardt | | 166/308.6 |
| 5,067,556 A | 11/1991 | Fudono et al. | | 62/196.4 |
| 5,074,359 A | 12/1991 | Schmidt | | 166/280.1 |
| 5,074,991 A | 12/1991 | Weers | | 208/236 |
| 5,082,579 A | 1/1992 | Dawson | | 507/211 |
| 5,106,518 A | 4/1992 | Cooney et al. | | 507/21 |
| 5,110,486 A | 5/1992 | Manalastas et al. | | 507/260 |
| 5,169,411 A | 12/1992 | Weers | | 44/421 |
| 5,224,546 A | 7/1993 | Smith et al. | | 166/300 |
| 5,228,510 A | 7/1993 | Jennings, Jr. et al. | | 166/263 |
| 5,246,073 A | 9/1993 | Sandiford et al. | | 166/295 |
| 5,259,455 A | 11/1993 | Nimerick et al. | | 166/308.5 |
| 5,330,005 A | 7/1994 | Card et al. | | 166/280.2 |
| 5,342,530 A | 8/1994 | Aften et al. | | 252/8.551 |
| 5,347,004 A | 9/1994 | Rivers et al. | | 544/180 |
| 5,363,919 A | 11/1994 | Jennings, Jr. | | 166/308.1 |
| 5,402,846 A | 4/1995 | Jennings, Jr. et al. | | 166/259 |
| 5,411,091 A | 5/1995 | Jennings, Jr. et al. | | 166/280.1 |
| 5,424,284 A | 6/1995 | Patel et al. | | 507/129 |
| 5,439,055 A | 8/1995 | Card et al. | | 166/280.2 |
| 5,462,721 A | 10/1995 | Pounds et al. | | 423/226 |
| 5,465,792 A | 11/1995 | Dawson et al. | | 166/295 |
| 5,472,049 A | 12/1995 | Chaffe et al. | | 166/250.1 |
| 5,482,116 A | 1/1996 | El-Rabaa et al. | | 166/250.1 |
| 5,488,083 A | 1/1996 | Kinsey, III et al. | | 507/211 |
| 5,497,831 A | 3/1996 | Hainey et al. | | 166/308.1 |
| 5,501,275 A | 3/1996 | Card et al. | | 166/280.2 |
| 5,539,044 A | 7/1996 | Dindi et al. | | 524/570 |
| 5,551,516 A | 9/1996 | Norman et al. | | 166/308.2 |
| 5,624,886 A | 4/1997 | Dawson et al. | | 507/217 |
| 5,635,458 A | 6/1997 | Lee et al. | | 507/240 |
| 5,649,596 A | 7/1997 | Jones et al. | | 166/300 |
| 5,669,447 A | 9/1997 | Walker et al. | | 166/300 |
| 5,674,377 A | 10/1997 | Sullivan, III et al. | | 208/208 R |
| 5,688,478 A | 11/1997 | Pounds et al. | | 423/228 |
| 5,693,837 A | 12/1997 | Smith et al. | | 556/148 |
| 5,711,396 A | 1/1998 | Joerg et al. | | 180/444 |
| 5,722,490 A | 3/1998 | Ebinger | | 166/281 |
| 5,744,024 A | 4/1998 | Sullivan, III et al. | | 208/236 |
| 5,755,286 A | 5/1998 | Ebinger | | 166/281 |
| 5,775,425 A | 7/1998 | Weaver et al. | | 166/276 |
| 5,787,986 A | 8/1998 | Weaver et al. | | 166/280.2 |
| 5,806,597 A | 9/1998 | Tjon-Joe-Pin et al. | | 166/300 |
| 5,807,812 A | 9/1998 | Smith et al. | | 507/238 |
| 5,833,000 A | 11/1998 | Weaver et al. | | 166/276 |
| 5,853,048 A | 12/1998 | Weaver et al. | | 166/279 |
| 5,871,049 A | 2/1999 | Weaver et al. | | 166/276 |
| 5,877,127 A | 3/1999 | Card et al. | | 507/273 |
| 5,908,073 A | 6/1999 | Nguyen et al. | | 166/276 |
| 5,908,814 A | 6/1999 | Patel et al. | | 507/131 |
| 5,964,295 A | 10/1999 | Brown et al. | | 166/308.2 |
| 5,979,557 A | 11/1999 | Card et al. | | 166/300 |
| 5,980,845 A | 11/1999 | Cherry | | 423/229 |
| 6,001,887 A | 12/1999 | Keup et al. | | 516/118 |
| 6,016,871 A | 1/2000 | Burts, Jr. | | 166/300 |
| 6,035,936 A | 3/2000 | Whalen | | 166/308.5 |
| 6,047,772 A | 4/2000 | Weaver et al. | | 166/276 |
| 6,054,417 A | 4/2000 | Graham et al. | | 507/238 |
| 6,059,034 A | 5/2000 | Rickards et al. | | 166/280.2 |
| 6,060,436 A | 5/2000 | Synder et al. | | 507/266 |
| 6,063,972 A | 5/2000 | Duncum et al. | | 585/15 |
| 6,069,118 A | 5/2000 | Hinkel et al. | | 507/277 |
| 6,123,394 A | 9/2000 | Jeffrey | | 299/16 |
| 6,133,205 A | 10/2000 | Jones | | 507/276 |
| 6,147,034 A | 11/2000 | Jones et al. | | 507/238 |
| 6,162,449 A | 12/2000 | Maier et al. | | 424/401 |
| 6,162,766 A | 12/2000 | Muir et al. | | 507/267 |
| 6,169,058 B1 | 1/2001 | Le et al. | | 507/222 |
| 6,228,812 B1 | 5/2001 | Dawson et al. | | 507/221 |
| 6,247,543 B1 | 6/2001 | Patel et al. | | 175/64 |
| 6,267,938 B1 | 7/2001 | Warrender et al. | | 423/226 |
| 6,283,212 B1 | 9/2001 | Hinkel et al. | | 166/279 |
| 6,291,405 B1 | 9/2001 | Lee et al. | | 507/136 |
| 6,311,773 B1 | 11/2001 | Todd et al. | | |
| 6,330,916 B1 | 12/2001 | Rickards et al. | | 166/280.2 |
| 6,725,931 B2 | 4/2004 | Nguyen et al. | | 166/280.2 |
| 6,756,345 B2 | 6/2004 | Pakulski et al. | | 507/246 |
| 6,793,018 B2 | 9/2004 | Dawson et al. | | 166/300 |
| 6,832,650 B2 | 12/2004 | Nguyen et al. | | 166/279 |
| 6,875,728 B2 | 4/2005 | Gupta et al. | | 507/240 |
| 6,983,801 B2 | 1/2006 | Dawson et al. | | |
| 7,268,100 B2 | 9/2007 | Kippie et al. | | 507/244 |
| 7,350,579 B2 | 4/2008 | Gatlin et al. | | 166/308.3 |
| 7,392,847 B2 | 7/2008 | Gatlin et al. | | 166/280.2 |
| 7,517,447 B2 | 4/2009 | Gatlin | | 208/236 |
| 7,565,933 B2 | 7/2009 | Kippie et al. | | |
| 7,566,686 B2 | 7/2009 | Kippie et al. | | 507/213 |
| 7,712,535 B2 | 5/2010 | Venditto et al. | | |
| 7,767,628 B2 | 8/2010 | Kippie et al. | | 507/102 |
| 7,829,510 B2 | 11/2010 | Gatlin et al. | | |
| 7,886,824 B2 | 2/2011 | Kakadjian et al. | | |
| 7,915,203 B2 | 3/2011 | Falana et al. | | |
| 7,932,214 B2 | 4/2011 | Zamora et al. | | |
| 7,942,201 B2 | 5/2011 | Ekstrand et al. | | |
| 7,956,017 B2 | 6/2011 | Gatlin et al. | | |
| 7,956,217 B2 | 6/2011 | Falana et al. | | |
| 7,971,659 B2 | 7/2011 | Gatlin et al. | | 510/492 |
| 7,989,404 B2 | 8/2011 | Kakadjian et al. | | |
| 7,992,653 B2 | 8/2011 | Zamora et al. | | |
| 8,011,431 B2 | 9/2011 | van Petegem et al. | | |
| 8,028,755 B2 | 10/2011 | Darnell et al. | | |
| 8,034,750 B2 | 10/2011 | Thompson et al. | | |
| 8,084,401 B2 | 12/2011 | Lukocs et al. | | 507/238 |
| 8,093,431 B2 | 1/2012 | Falana et al. | | |
| 8,097,567 B2 | 1/2012 | Wilson, Jr. | | 507/131 |
| 8,141,661 B2 | 3/2012 | Kakadjian et al. | | |
| 8,158,562 B2 | 4/2012 | Wilson, Jr. et al. | | |
| 8,172,952 B2 | 5/2012 | Wanner et al. | | |
| 8,220,546 B2 | 7/2012 | Kakadjian et al. | | |
| 8,258,339 B2 | 9/2012 | Falana et al. | | |
| 8,273,693 B2 | 9/2012 | Schwartz | | |
| 8,287,640 B2 | 10/2012 | Zamora et al. | | |
| 8,362,298 B2 | 1/2013 | Falana et al. | | |
| 8,466,094 B2 | 6/2013 | Kakadjian et al. | | |
| 8,475,585 B2 | 7/2013 | Zamora et al. | | |
| 8,507,412 B2 | 8/2013 | Lukocs et al. | | |
| 8,507,413 B2 | 8/2013 | Wilson, Jr. | | |
| 8,524,639 B2 | 9/2013 | Falana et al. | | |

(56) References Cited

U.S. PATENT DOCUMENTS

| | | |
|---|---|---|
| 8,530,394 B2 | 9/2013 | Gatlin |
| 8,563,481 B2 | 10/2013 | Gatlin et al. ............... 507/203 |
| 8,714,283 B2 | 5/2014 | Gatlin et al. |
| 8,728,989 B2 | 5/2014 | Kakadjian et al. |
| 8,772,203 B2 | 7/2014 | Schwartz |
| 8,835,364 B2 | 9/2014 | Thompson et al. |
| 8,841,240 B2 | 9/2014 | Kakadjian et al. |
| 8,846,585 B2 | 9/2014 | Falana et al. |
| 8,851,174 B2 | 10/2014 | Zamora et al. |
| 8,871,694 B2 | 10/2014 | Kakadjian et al. |
| 8,899,328 B2 | 12/2014 | Zamora et al. |
| 8,932,996 B2 | 1/2015 | Falana et al. |
| 8,944,164 B2 | 2/2015 | Veldman et al. |
| 8,946,130 B2 | 2/2015 | Zamora et al. |
| 8,950,493 B2 | 2/2015 | van Petegem et al. |
| 2002/0049256 A1 | 4/2002 | Bergeron, Jr. ............... 514/674 |
| 2002/0165308 A1 | 11/2002 | Kinniard et al. ............... 524/492 |
| 2003/0220204 A1 | 11/2003 | Baran, Jr. et al. ............... 507/200 |
| 2005/0045330 A1 | 3/2005 | Nguyen et al. ............... 166/281 |
| 2005/0092489 A1 | 5/2005 | Welton et al. ............... 166/280.2 |
| 2006/0041028 A1 | 2/2006 | Crews |
| 2008/0099207 A1* | 5/2008 | Venditto et al. ............... 166/308.3 |
| 2009/0247430 A1 | 10/2009 | Fu ............... 507/211 |
| 2010/0252262 A1 | 10/2010 | Ekstrand et al. |
| 2010/0305010 A1 | 12/2010 | Falana et al. |
| 2010/0311620 A1 | 12/2010 | Kakadjian et al. |
| 2011/0001083 A1 | 1/2011 | Falana et al. |
| 2011/0177982 A1 | 7/2011 | Ekstrand et al. |
| 2011/0240131 A1 | 10/2011 | Parker |
| 2012/0071367 A1 | 3/2012 | Falana et al. |
| 2012/0073813 A1 | 3/2012 | Zamora et al. |
| 2012/0097893 A1 | 4/2012 | Wanner et al. |
| 2012/0273206 A1 | 11/2012 | Zamora et al. |
| 2012/0279727 A1 | 11/2012 | Kakadjian et al. |
| 2012/0295820 A1 | 11/2012 | Falana et al. |
| 2012/0302468 A1 | 11/2012 | Falana et al. |
| 2012/0325329 A1 | 12/2012 | Schwartz |
| 2013/0081820 A1 | 4/2013 | Falana et al. |
| 2013/0096038 A1 | 4/2013 | Kim et al. |
| 2013/0175477 A1 | 7/2013 | Falana et al. |
| 2013/0270012 A1 | 10/2013 | Kakadjian et al. |
| 2013/0274151 A1 | 10/2013 | Kakadjian et al. |
| 2013/0312977 A1 | 11/2013 | Lembcke et al. |
| 2013/0331301 A1 | 12/2013 | Falana et al. |
| 2014/0087977 A1 | 3/2014 | Kim et al. |
| 2014/0128294 A1 | 5/2014 | Gatlin et al. |
| 2014/0128308 A1 | 5/2014 | Levey et al. |
| 2014/0166285 A1 | 6/2014 | Santra et al. |
| 2014/0262287 A1 | 9/2014 | Treybig et al. |
| 2014/0262319 A1 | 9/2014 | Treybig et al. |
| 2014/0303048 A1 | 10/2014 | Kakadjian et al. |
| 2014/0315763 A1 | 10/2014 | Kakadjian et al. |
| 2014/0318793 A1 | 10/2014 | van Petergem et al. |
| 2014/0318795 A1 | 10/2014 | Thompson, Sr. et al. |
| 2014/0323360 A1 | 10/2014 | Comarin et al. |
| 2014/0323362 A1 | 10/2014 | Falana et al. |
| 2015/0007989 A1 | 1/2015 | Tan et al. |
| 2015/0011440 A1 | 1/2015 | Zamora et al. |
| 2015/0051311 A1 | 2/2015 | Zamora et al. |
| 2015/0068747 A1 | 3/2015 | Hwang et al. |
| 2015/0072901 A1 | 3/2015 | Samuel et al. |
| 2015/0087561 A1 | 3/2015 | Falana et al. |
| 2015/0087562 A1 | 3/2015 | Falana et al. |

FOREIGN PATENT DOCUMENTS

| | | | |
|---|---|---|---|
| GB | 775376 | 10/1954 | |
| GB | 1073338 A | 6/1967 | ............... C09C 1/13 |
| JP | 10001461 | 6/1988 | ............... C07C 211/50 |
| JP | 08151422 | 11/1996 | |
| JP | 10110115 A | 4/1998 | |
| JP | 2005194148 A | 7/2005 | ............... C09C 3/08 |
| WO | WO 98/56497 | 12/1998 | ............... B01F 17/00 |
| WO | 02055843 A1 | 7/2002 | |
| WO | 2008090316 A1 | 7/2008 | |
| WO | WO 2009141308 | 11/2009 | ............... C09K 8/528 |

* cited by examiner

FIG. 3 ered the same:

COMPOSITIONS AND METHODS FOR BREAKING HYDRAULIC FRACTURING FLUIDS

RELATED APPLICATIONS

This application is a divisional application and claims the benefit of and priority to U.S. patent application Ser. No. 12/758,466, filed Apr. 12, 2010.

BACKGROUND OF THE INVENTION

1. Field of the Invention

Embodiments of this invention relate to a breaking composition for controlled breaking of borate cross-linked fracturing fluids, and to method for making and using same.

More particularly, embodiments of this invention relate to a breaking composition for controlled breaking of borate cross-linked fracturing fluids, and to method for making and using same, where the composition includes an oxidative component and an ester component.

2. Description of the Related Art

One of the key problems in the use of slick water, linear gels and cross-linked fluids for stimulation and fracturing applications is to find a composition and/or method that controllably breaks such polymer viscosified systems at bottom hole conditions. The ideal breakers are those that are in a liquid state and can be delivered under controlled or controllable conditions sufficient to reduce a down hole fluid viscosity to a desired low value during a formation stimulation, i.e., for a time not shorter than and not much longer than a time needed to complete the formation stimulation.

There are many effective oxidative breakers, acid breakers, terpenes breaker and enzymes breaker or combination thereof either in the form of a pure material, a solution, a suspension or an encapsulated form that most of the time break the fluid in shorter or longer periods of time than needed to complete the formation stimulation. These breakers are only effective in narrow ranges of temperatures, which are not necessarily identical to or similar to bottom hole conditions. These systems have been introduced and widely used by services companies including Halliburton, Shlumberger, BJ Services, Weatherford, Mich., Baroid, Baker Hughes, among others.

U.S. Pat. No. 5,413,178 disclosed a composition and method for breaking polymer viscosified fluids using an alkali metal chlorite or hypochlorite, which releases oxygen chloride in a controllable manner to break down the polymer structure, and, therefore, decrease the viscosity of the polymer viscosified fluids.

Historically, breaking of the borate cross-linked fracturing fluids was based on either oxidative breakers introduced by Halliburton, Schlumberger and BJ Services or more recently enzymes and esters breakers introduced by BJ Services.

U.S. Pat. No. 5,067,566 disclosed the use of esters that slowly hydrolyzes producing acids therefore when combined with enzymes favors the enzymatic degradation of the galactommana at pH lower than 9.0. U.S. Pat. No. 5,413,178 disclosed the use of chlorite and hyprchlorite systems as oxidative breakers for stabilized viscosified fluids.

Although there are numerous breaking composition for use with borate cross-linked fracturing fluids, there is still a need in the art for new breaking systems, especially breaking systems for borate fracturing fluids producing less residuals and reducing re-healing when the temperature or pH is reduced.

SUMMARY OF THE INVENTION

Embodiments of the present invention provide a breaking system including thermal hydrolyzable ester component and an oxidative component, where the esters hydrolyze at a temperature range between about 100° F. and about 260° F. to generate organic acids in situ and where the breaking system is adapted to degrade borate cross-linked fracturing fluids in a controlled manner, while producing less residuals and reducing re-healing when the temperature and/or pH is reduced. In certain embodiments, the ester component includes a mixture of esters of dicarboxylic acids having between 2 and 20 carbon atoms.

Embodiments of the present invention provide a breaking system including an ester component comprising a mixture of thermal hydrolyzable esters and an oxidative component, where the esters hydrolyze at a temperature range between about 100° F. and about 260° F. to generate organic acids in situ and where the breaking system is adapted to degrade borate cross-linked fracturing fluids in a controlled manner, while producing less residuals and reducing re-healing when the temperature and/or pH is reduced. In certain embodiments, the ester component includes a mixture of esters of dicarboxylic acids having between 2 and 20 carbon atoms.

Embodiments of the present invention provide method for breaking a borate cross-linked fracturing fluid including adding an effective amount of a breaking system including thermal hydrolyzable ester component and an oxidative component, where the esters hydrolyze at a temperature range between about 100° F. and about 260° F. to generate organic acids in situ to a borate cross-linked fracturing fluid in a controlled manner. The breaking system produces less residuals and reducing re-healing when the temperature and/or pH is reduced. The effective amount is an amount sufficient to achieve a desired break rate of the borate cross-linked fracturing fluid. In certain embodiments, the ester component includes a mixture of esters of dicarboxylic acids having between 2 and 20 carbon atoms.

Embodiments of the present invention provide method for fracturing a formation including injecting, into a formation to be fractured, a fracturing fluid including an effective amount of a breaking a breaking system including thermal hydrolyzable ester component and an oxidative component, where the esters hydrolyze at a temperature range between about 100° F. and about 250° F. to generate organic acids in situ and a borate cross-linked system in a controlled manner. The breaking system produces less residuals and reducing re-healing when the temperature and/or pH is reduced. The effective amount is an amount sufficient to achieve a desired break rate of the breaking of the borate cross-linked fracturing fluid. In certain embodiments, the ester component includes a mixture of esters of dicarboxylic acids having between 2 and 20 carbon atoms.

BRIEF DESCRIPTION OF THE DRAWINGS

The invention can be better understood with reference to the following detailed description together with the appended illustrative drawings in which like elements are numbered the same.

DEFINITIONS USED IN THE INVENTION

The term "gpt" means gallons per thousand gallons.
The term "gptg" means gallons per thousand gallons.

The term "pptg" means pounds per thousand gallons.

The term "wt. %" means weight percent.

The term "w/w" means weight per weight.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present invention include, but are not limited to, conventional proppants familiar to those skilled in the art such as sand, 20-40 mesh sand, resin-coated sand, sintered bauxite, glass beads, and similar materials.

The abbreviation "RPM" refers to relative permeability modifiers.

The term "surfactant" refers to a soluble, or partially soluble compound that reduces the surface tension of liquids, or reduces inter-facial tension between two liquids, or a liquid and a solid by congregating and orienting itself at these interfaces.

DETAILED DESCRIPTION OF THE INVENTION

The inventors have found that a breaker composition or system for borate cross-linked fracturing fluids can be prepared using a combination an ester component and an oxidative component, where the ester component comprises one or a plurality of slowly hydrolyzable esters. The inventors have found that the breaker composition or system favors oxygen release promoting a free radical breaking mechanism of the borate cross-linked fracturing fluid and at the same time reducing or minimizing re-healing of the gel system as the pH drops below 9.0 or the temperature is reduced.

Embodiments of the present invention relates to a breaker composition for borate cross-linked fracturing fluid or gel system, where the composition includes an ester component and an oxidative component adapted to reduce a viscosity of a borate viscosified fluid to a desired lower value at down hole conditions within a time period coincident with a formation stimulation time, where the composition breaks the fracturing fluid in a controlled manner, producing less residuals and reducing re-healing when the temperature and/or pH is reduced. In certain embodiments, the ester component includes a mixture of esters of dicarboxylic acids having between 2 and 20 carbon atoms.

Embodiments of the present invention relates to a breaker composition for borate cross-linked fracturing fluid or gel system, where the composition includes an ester component and an oxidative component adapted to reduce a viscosity of a borate viscosified fluid to a desired lower value at down hole conditions within a time period coincident with a formation stimulation time, generally between about 30 minutes and 195 minutes, where the composition breaks the fracturing fluid in a controlled manner, producing less residuals and reducing re-healing when the temperature and/or pH is reduced. In certain embodiments, the ester component includes a mixture of esters of dicarboxylic acids having between 2 and 20 carbon atoms.

Embodiments of the present invention relates to a method for breaking a borate cross-linked fracturing fluid including adding an effective amount of a breaking composition comprising an ester component and an oxidative component into the borate cross-linked fracturing fluid, where the breaking composition breaks the fluid in a controlled manner reducing a viscosity of the fluid over a given time period, producing less residuals and reducing re-healing when the temperature and/or pH is reduced. In certain embodiments, the ester component includes a mixture of esters of dicarboxylic acids having between 2 and 20 carbon atoms.

Embodiments of the present invention relates to a method for stimulating a formation including the step of injecting, into a formation under fracturing condition, a fracturing fluid including an effective amount of a breaking composition comprising an ester component and an oxidative component into the borate cross-linked fracturing fluid, where the breaking composition breaks the fluid in a controlled manner reducing a viscosity of the fluid over a given time period, producing less residuals and reducing re-healing when the temperature and/or pH is reduced. In certain embodiments, the ester component includes a mixture of esters of dicarboxylic acids having between 2 and 20 carbon atoms.

The breaking compositions of this invention include from about 1 gpt to about 20 gpt of the oxidative component and from about 0.1 gpt to about 5 gpt of the ester component. In certain embodiment, the breaking compositions of this invention include from about 2 gpt to about 18 gpt of the oxidative component and from about 0.5 gpt to about 5 gpt of the ester component. In certain embodiment, the breaking compositions of this invention include from about 4 gpt to about 18 gpt of the oxidative component and from about 0.5 gpt to about 5 gpt of the ester component. In certain embodiment, the breaking compositions of this invention include from about 6 gpt to about 18 gpt of the oxidative component and from about 0.5 gpt to about 5 gpt of the ester component. In certain embodiment, the breaking compositions of this invention include from about 8 gpt to about 16 gpt of the oxidative component and from about 0.5 gpt to about 4 gpt of the ester component. In certain embodiment, the breaking compositions of this invention include from about 10 gpt to about 14 gpt of the oxidative component and from about 0.5 gpt to about 3 gpt of the ester component. In certain embodiment, the breaking compositions of this invention include from about 10 gpt to about 14 gpt of the oxidative component and from about 0.5 gpt to about 2 gpt of the ester component.

The breaking compositions of this invention include an oxidative component and an ester component present in a gpt ratio of between about 4:1 to about 20:1. For temperature applications of about 180° F., the ratio is between about 5:1 and about 8:1. For temperature applications of about 200° F., the ratio is between about 8:1 and about 11:1. For temperature applications of about 220° F., the ratio is between about 11:1 and about 13:1. These ratios are designed so that the breaking profile of the breaking systems are substantially similar at these temperatures. As the temperature goes up, the relative amount of the ester components goes do to maintain a substantially similar breaking profile.

In certain embodiments, the amount of the ester component added to the oxidative component is sufficient to achieve a breaking profile including time to break and maximum fracturing fluid viscosity substantially the same regardless of temperature, where substantially means that the time to break and the maximum fracturing fluid viscosity are within about 20% for each temperature. In other embodiments, the time to break and the maximum fracturing fluid viscosity are within about 15% for each temperature. In other embodiments, the time to break and the maximum fracturing fluid viscosity are within about 10% for each temperature.

Suitable Regents

Suitable oxidative components for use in the invention include, without limitation, aqueous alkali chlorite solutions.

The oxidative components is generally present in an amount between about 1 wt. % and about 20 wt. % in water. In certain embodiments, the oxidative component is present in an amount between about 5 wt. % and about 15 wt. %. Exemplary alkali chlorites include lithium, sodium, potassium, rubidium, and/or cesium chlorites. In certain embodiments, the oxidative component comprises an aqueous solution of sodium chlorite. The oxidative components can also include an additive selected from the group consisting of an additive selected from the group consisting of an alkali metal chlorate, an alkali metal chloride, and mixtures or combinations thereof, where the alkali metal includes lithium, sodium, potassium, rubidium, and/or cesium. In certain embodiments, the additive is selected from the group consisting of sodium chlorate, potassium chlorate, sodium chloride, potassium chloride, and mixtures or combinations thereof. The additives are generally present in an amount between about 0.5 wt. % and 10 wt. %.

Suitable esters for use in the ester component of this invention include, without limitation, an ester of a carboxylic acid or a mixture of esters of carboxylic acids, where the carboxylic acids can have between 2 and 20 carbon atoms and the ester groups are carbyl group having between 1 and 10 carbon atoms, where one or more of the carbon atoms can be replaced by an oxygen atom. In certain embodiments, the carboxylic acids comprises linear or branched dicarboxylics. In certain embodiments, the dicarboxylic acids are linear dicarboxylic acids having between 3 and 20 carbon atoms. In other embodiments, the dicarboxylic acids are linear dicarboxylic acids having between 4 and 10 carbon atoms. The esters are carbyl esters having between 1 and 10 carbon atoms. In certain embodiments, the esters have between 1 and 5 carbon atoms. In certain embodiments, the ester component comprises an dicarbyl ester of a dicarboxylic acid or a mixture of dicarbyl esters of dicarboxylic acids. In other embodiments, the esters component comprises an dialkyl ester of a dicarboxylic acid or a mixture of dialkyl esters of dicarboxylic acids, where the dicarboxylic acids include 3 to 8 carbon atoms and the alkyl groups include 1 to 5 carbon atoms. In other embodiments, the ester component comprises a mixture of dialkyl esters of dicarboxylic acids, where the dicarboxylic acids include 4 to 6 carbon atoms and the alkyl groups include 1 to 2 carbon atoms. Exemplary dialkyl dicarboxylic acids include, without limitation, dimethyl malonic (C3 linear dicarboxylic) acid, diethyl malonic acid, ethyl, methyl malonic acid, diethyl malonic acid, dimethyl succinic (C4 linear dicarboxylic) acid, diethyl succinic acid, ethyl, methyl succinic acid, diethyl succinic acid, dimethyl glutaric (C5 linear dicarboxylic) acid, diethyl glutaric acid, ethyl, methyl glutaric acid, diethyl glutaric acid, dimethyl adipic (C6 linear dicarboxylic) acid, diethyl adipic acid, ethyl, methyl adipic acid, diethyl adipic acid, dimethyl pimelic (C7 linear dicarboxylic) acid, diethyl pimelic acid, ethyl, methyl pimelic acid, diethyl pimelic acid, dimethyl suberic (C8 linear dicarboxylic) acid, diethyl suberic acid, ethyl, methyl suberic acid, diethyl suberic acid, dimethyl azelaic (C9 linear dicarboxylic) acid, diethyl azelaic acid, ethyl, methyl azelaic acid, diethyl azelaic acid, dimethyl sebacic (C10 linear dicarboxylic) acid, diethyl sebacic acid, ethyl, methyl sebacic acid, diethyl sebacic acid, and mixtures thereof. In other embodiments, the ester component includes a mixture of C4 to C6 esters of linear dicarboxylic acid. In other embodiments, the ester component includes from about 17 wt. % to 27 wt. % of dimethyl succinate, from about 57 wt. % to about 73 wt. % of dimethyl glutarate, and from about 10 wt. % to 20 wt. % of dimethyl adipate.

Suitable hydratable water soluble polymers for use in fracturing fluids of this invention include, without limiation, polysaccharides, polyacrylamides, and polyacrylamide copolymers. Suitable polysaccharides include galactomannan gum and cellulose derivatives. In certain embodiments, the polysaccharides include guar gum, locust bean gum, carboxymethylguar, hydroxyethylguar, hydroxypropylguar, carboxymethylhydroxypropylguar, carboxymethylhydroxyethylguar, hydroxymethyl cellulose, carboxymethylhydroxyethyl cellulose, and hydroxyethyl cellulose.

The hydratable polymer useful in the present invention can be any of the hydratable polysaccharides having galactose or mannose monosaccharide components and are familiar to those in the well service industry. These polysaccharides are capable of gelling in the presence of a crosslinking agent to form a gelled based fluid. For instance, suitable hydratable polysaccharides are the galactomannan gums, guars and derivatized guars. Specific examples are guar gum and guar gum derivatives. Suitable gelling agents are guar gum, hydroxypropyl guar and carboxymethyl hydroxypropyl guar. In certain embodiment, the hydratable polymers for the present invention are guar gum and carboxymethyl hydroxypropyl guar and hydroxypropyl guar. Other exemplary fracturing fluid formulations are disclosed in U.S. Pat. Nos. 5,201,370 and 6,138,760, which are incorporated herein by reference.

The hydratable polymer is added to the aqueous fluid in concentrations ranging from about 0.12% to 0.96% by weight of the aqueous fluid. In certain embodiments, the range for the present invention is about 0.3% to about 0.48% by weight.

In addition to the hydratable polymer, the fracturing fluids of the invention include a borate cross-linking system. In the case of the borate crosslinkers, the crosslinking agent is any material which supplies borate ions in solution. Thus the crosslinking agent can be any convenient source of borate ions, for instance the alkali metal and the alkaline earth metal borates and boric acid. In certain embodiments, the crosslinking additive is sodium borate decahydrate. In certain embodiments, this crosslinking additive is in the range from about 0.024% to in excess of 0.18% by weight of the aqueous fluid. In certain embodiments, the concentration of crosslinking agent is in the range from about 0.024% to about 0.09% by weight of the aqueous fluid.

Propping agents are typically added to the base fluid prior to the addition of the crosslinking agent. Propping agents include, for instance, quartz sand grains, glass and ceramic beads, walnut shell fragments, aluminum pellets, nylon pellets, and the like. The propping agents are normally used in concentrations between about 1 to 18 pounds per gallon of fracturing fluid composition, but higher or lower concentrations can be used as required. The base fluid can also contain other conventional additives common to the well service industry such as surfactants, and the like.

In a typical fracturing operation, the fracturing fluid is pumped at a rate sufficient to initiate and propagate a fracture in the formation and to place propping agents into the fracture. A typical fracturing treatment would be conducted by hydrating a 0.24% to 0.72% (weight/volume [w/v]) galactomannan based polymer, such as guar, in a 2% (w/v) KCl solution. In addition to the encapsulated viscosity reducing microbes, the fracturing fluid may include additives such as the crosslinking agent, proppant, and other additives.

Fracturing Fluids

Generally, a hydraulic fracturing treatment involves pumping a proppant-free viscous fluid, or pad, usually water with some fluid additives to generate high viscosity, into a well faster than the fluid can escape into the formation so that the pressure rises and the rock breaks, creating artificial fracture and/or enlarging existing fracture. After fracturing the formation, a propping agent, generally a solid material such as sand is added to the fluid to form a slurry that is pumped into the newly formed fractures in the formation to prevent them from closing when the pumping pressure is released. The proppant transport ability of a base fluid depends on the type of viscosifying additives added to the water base.

Water-base fracturing fluids with water-soluble polymers added to make a viscosified solution are widely used in the art of fracturing. Since the late 1950s, more than half of the fracturing treatments are conducted with fluids comprising guar gums, high-molecular weight polysaccharides composed of mannose and galactose sugars, or guar derivatives such as hydropropyl guar (HPG), carboxymethyl guar (CMG), carboxymethylhydropropyl guar (CMHPG). Crosslinking agents based on boron compounds or boron and one or more of titanium, zirconium or aluminum complexes are typically used to increase the effective molecular weight of the polymer and make them better suited for use in high-temperature wells.

To a lesser extent, cellulose derivatives such as hydroxyethylcellulose (HEC) or hydroxypropylcellulose (HPC) and carboxymethylhydroxyethylcellulose (CMHEC) are also used, with or without crosslinkers. Xanthan and scleroglucan, two biopolymers, have been shown to have excellent proppant-suspension ability even though they are more expensive than guar derivatives and therefore used less frequently. Polyacrylamide and polyacrylate polymers and copolymers are used typically for high-temperature applications or friction reducers at low concentrations for all temperatures ranges.

Polymer-free, water-base fracturing fluids can be obtained using viscoelastic surfactants. These fluids are normally prepared by mixing in appropriate amounts of suitable surfactants such as anionic, cationic, nonionic and zwitterionic surfactants. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers for instance can be simultaneously pumped. By selecting proppants having a contrast in one of such properties such as density, size and concentrations, different settling rates will be achieved.

"Waterfrac treatments employ the use of low cost, low viscosity fluids in order to stimulate very low permeability reservoirs. The results have been reported to be successful (measured productivity and economics) and rely on the mechanisms of asperity creation (rock spalling), shear displacement of rock and localized high concentration of proppant to create adequate conductivity. It is the last of the three mechanisms that is mostly responsible for the conductivity obtained in "waterfrac" treatments. The mechanism can be described as analogous to a wedge splitting wood.

An aqueous fracturing fluid may be prepared by blending a hydratable polymer with an aqueous base fluid. The base aqueous fluid can be, for example, water or brine. Any suitable mixing apparatus may be used for this procedure. In the case of batch mixing, the hydratable polymer and aqueous fluid are blended for a period of time which is sufficient to form a hydrated sol.

Hydraulic fracturing techniques are widely employed to enhance oil and gas production from subterranean formations. During hydraulic fracturing, fluid is injected into a well bore under high pressure. Once the natural reservoir pressures are exceeded, the fracturing fluid initiates a fracture in the formation which generally continues to grow during pumping. As the fracture widens to a suitable width during the course of the treatment, a propping agent is then also added to the fluid. The treatment design generally requires the fluid to reach a maximum viscosity as it enters the fracture which affects the fracture length and width. The viscosity of most fracturing fluids is generated from water-soluble polysaccharides, such as galactomannans or cellulose derivatives. Employing crosslinking agents, such as borate, titanate, or zirconium ions, can further increase the viscosity. The gelled fluid may be accompanied by a propping agent (i.e., proppant) which results in placement of the proppant within the fracture thus produced. The proppant remains in the produced fracture to prevent the complete closure of the fracture and to form a conductive channel extending from the well bore into the formation being treated once the fracturing fluid is recovered.

In order for the treatment to be successful, in certain embodiments, the fluid viscosity eventually diminish to levels approaching that of water after the proppant is placed. This allows a portion of the treating fluid to be recovered without producing excessive amounts of proppant after the well is opened and returned to production. The recovery of the fracturing fluid is accomplished by reducing the viscosity of the fluid to a lower value such that it flows naturally from the formation under the influence of formation fluids. This viscosity reduction or conversion is referred to as "breaking" and can be accomplished by incorporating chemical agents, referred to as "breakers," into the initial gel.

Certain gels of fracturing fluids, such as those based upon guar polymers, undergo a natural break without the intervention of a breaking agent. However, the breaking time for such gelled fluids generally is excessive and impractical, being somewhere in the range from greater than 24 hours to in excess of weeks, months, or years depending on reservoir conditions. Accordingly, to decrease the break time of gels used in fracturing, chemical agents are usually incorporated into the gel and become a part of the gel itself. Typically, these agents are either oxidants or enzymes which operate to degrade the polymeric gel structure. Most degradation or "breaking" is caused by oxidizing agents, such as persulfate salts (used either as is or encapsulated), chromous salts, organic peroxides or alkaline earth or zinc peroxide salts, or by enzymes.

In addition to the importance of providing a breaking mechanism for the gelled fluid to facilitate recovery of the fluid and to resume production, the timing of the break is also of great importance. Gels which break prematurely can cause suspended proppant material to settle out of the gel before being introduced a sufficient distance into the produced fracture. Premature breaking can also lead to a premature reduction in the fluid viscosity, resulting in a less than desirable fracture width in the formation causing excessive injection pressures and premature termination of the treatment.

On the other hand, gelled fluids which break too slowly can cause slow recovery of the fracturing fluid from the produced fracture with attendant delay in resuming the production of formation fluids and severely impair anticipated hydrocarbon production. Additional problems may occur, such as the tendency of proppant to become dislodged from the fracture, resulting in at least partial closing and decreased efficiency of the fracturing operation. In certain embodiments, the fracturing gel should begin to break when the pumping operations are concluded. For practical purposes, in certain embodiments, the gel should be completely broken within about 24 hours after completion of the fracturing treatment. Gels useful in this regard include those disclosed in U.S. Pat. Nos. 3,960,736; 5,224,546; 6,756,345; and 6,793,018, incorporated herein by reference.

Suitable solvents fore use in this invention include, without limitation, water. The solvent may be an aqueous potassium chloride solution.

Suitable hydratable polymers that may be used in embodiments of the invention include any of the hydratable polysaccharides which are capable of forming a gel in the presence of a crosslinking agent. For instance, suitable hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. In certain embodiments, the gelling agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art.

The hydratable polymer may be present in the fluid in concentrations ranging from about 0.10% to about 5.0% by weight of the aqueous fluid. In certain embodiment, a range for the hydratable polymer is about 0.20% to about 0.80% by weight.

A suitable crosslinking agent can be any compound that increases the viscosity of the fluid by chemical crosslinking, physical crosslinking, or any other mechanisms. For example, the gellation of a hydratable polymer can be achieved by crosslinking the polymer with metal ions including boron in combination with zirconium, and titanium containing compounds. The amount of the crosslinking agent used also depends upon the well conditions and the type of treatment to be effected, but is generally in the range of from about 10 ppm to about 1000 ppm of metal ion of the crosslinking agent in the hydratable polymer fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

The boron constituent can be selected from the group consisting of boric acid, sodium tetraborate, and mixtures thereof. These are described in U.S. Pat. No. 4,514,309.), borate based ores such as ulexite and colemanite. In some embodiments, the well treatment fluid composition may further comprise a proppant.

"Premature breaking" as used herein refers to a phenomenon in which a gel viscosity becomes diminished to an undesirable extent before all of the fluid is introduced into the formation to be fractured. Thus, in certain embodiments, the gel viscosity should remain in the range from about 50% to about 75% of the initial viscosity of the gel for at least two hours of exposure to the expected operating temperature. In certain embodiments, the fluid should have a viscosity in excess of 100 centipoise (cP) at 100 sec$^{-1}$ while injection into the reservoir as measured on a Fann 50 C viscometer in the laboratory.

"Complete breaking" as used herein refers to a phenomenon in which the viscosity of a gel is reduced to such a level that the gel can be flushed from the formation by the flowing formation fluids or that it can be recovered by a swabbing operation. In laboratory settings, a completely broken, non-crosslinked gel is one whose viscosity is about 10 cP or less as measured on a Model 35 Fann viscometer having a R1B1 rotor and bob assembly rotating at 300 rpm.

The pH of an aqueous fluid which contains a hydratable polymer can be adjusted if necessary to render the fluid compatible with a crosslinking agent. In certain embodiments, a pH adjusting material is added to the aqueous fluid after the addition of the polymer to the aqueous fluid. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., between about 5 and about 14. In certain embodiments, the pH is kept neutral or basic, i.e., between about 7 and about 14. In other embodiments, the pH is between about 8 and about 12.

The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking". Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Generally, the temperature and the pH of a fracturing fluid affects the rate of hydrolysis of an ester. For downhole operations, the bottom hole static temperature ("BHST") cannot be easily controlled or changed. The pH of a fracturing fluid usually is adjusted to a level to assure proper fluid performance during the fracturing treatment. Therefore, the rate of hydrolysis of an ester could not be easily changed by altering BHST or the pH of a fracturing fluid. However, the rate of hydrolysis may be controlled by the amount of an ester used in a fracturing fluid. For higher temperature applications, the hydrolysis of an ester may be retarded or delayed by dissolving the ester in a hydrocarbon solvent. Moreover, the delay time may be adjusted by selecting esters that provide more or less water solubility. For example, for low temperature applications, polycarboxylic esters made from low molecular weight alcohols, such as methanol or ethanol, are recommended. The application temperature range for these esters could range from about 100° F. to about 260° F.

(about 37.7° C. to about 126.6° C.). In other embodiments, for higher temperature applications or longer injection times, esters made from higher molecular weight alcohols should be used. The higher molecular weight alcohols include, but are not limited to, $C_3$-$C_6$ alcohols, e.g., n-propanol, hexanol, and cyclohexanol.

Propping agents or proppants are typically added to the fracturing fluid prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

The well treatment fluid composition in accordance with embodiments of the invention has many useful applications. For example, it may be used in hydraulic fracturing, gravel packing operations, water blocking, temporary plugs for purposes of wellbore isolation and/or fluid loss control, and other well completion operations. One application of the fluid composition is to use it as a fracturing fluid. Accordingly, embodiments of the invention also provide a method of treating a subterranean formation. The method includes formulating a fracturing fluid comprising an aqueous fluid, a hydratable polymer, a crosslinking agent, an inorganic breaking agent, and an ester compound; and injecting the fracturing fluid into a bore hole to contact at least a part of the formation by the fracturing fluid under a sufficient pressure to fracture the formation. Initially, the viscosity of the fracturing fluid should be maintained above at least 300 cP at 100 sec$^{-1}$ during injection and, afterwards, should be reduced to less than 100 cP at 100 sec$^{-1}$. After the viscosity of the fracturing fluid is lowered to an acceptable level, at least a portion of the fracturing fluid is removed from the formation. During the fracturing process, a proppant can be injected into the formation simultaneously with the fracturing fluid. In certain embodiments, the fracturing fluid has a pH around or above about 7. In certain embodiments, the fracturing fluid has a pH in the range of about 8 to about 12.

It should be understood that the above-described method is only one way to carry out embodiments of the invention. The following U.S. patents disclose various techniques for conducting hydraulic fracturing which may be employed in embodiments of the invention with or without modifications: U.S. Pat. Nos. 6,169,058; 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041; 4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205.

The liquid carrier can generally be any liquid carrier suitable for use in oil and gas producing wells. On certain embodiments, the liquid carrier is water. The liquid carrier can comprise water, can consist essentially of water, or can consist of water. Water will typically be a major component by weight of the fluid. The water can be potable or non-potable water. The water can be brackish or contain other materials typical of sources of water found in or near oil fields. For example, it is possible to use fresh water, brine, or even water to which any salt, such as an alkali metal or alkali earth metal salt ($NaCO_3$, NaCl, KCl, etc.) has been added. In certain embodiments, the liquid carrier is in an amount of at least about 80% by weight. Specific examples of the amount of liquid carrier include 80%, 85%, 90%, and 95% by weight.

EXPERIMENTS OF THIS INVENTION

Example 1

Figure 1:
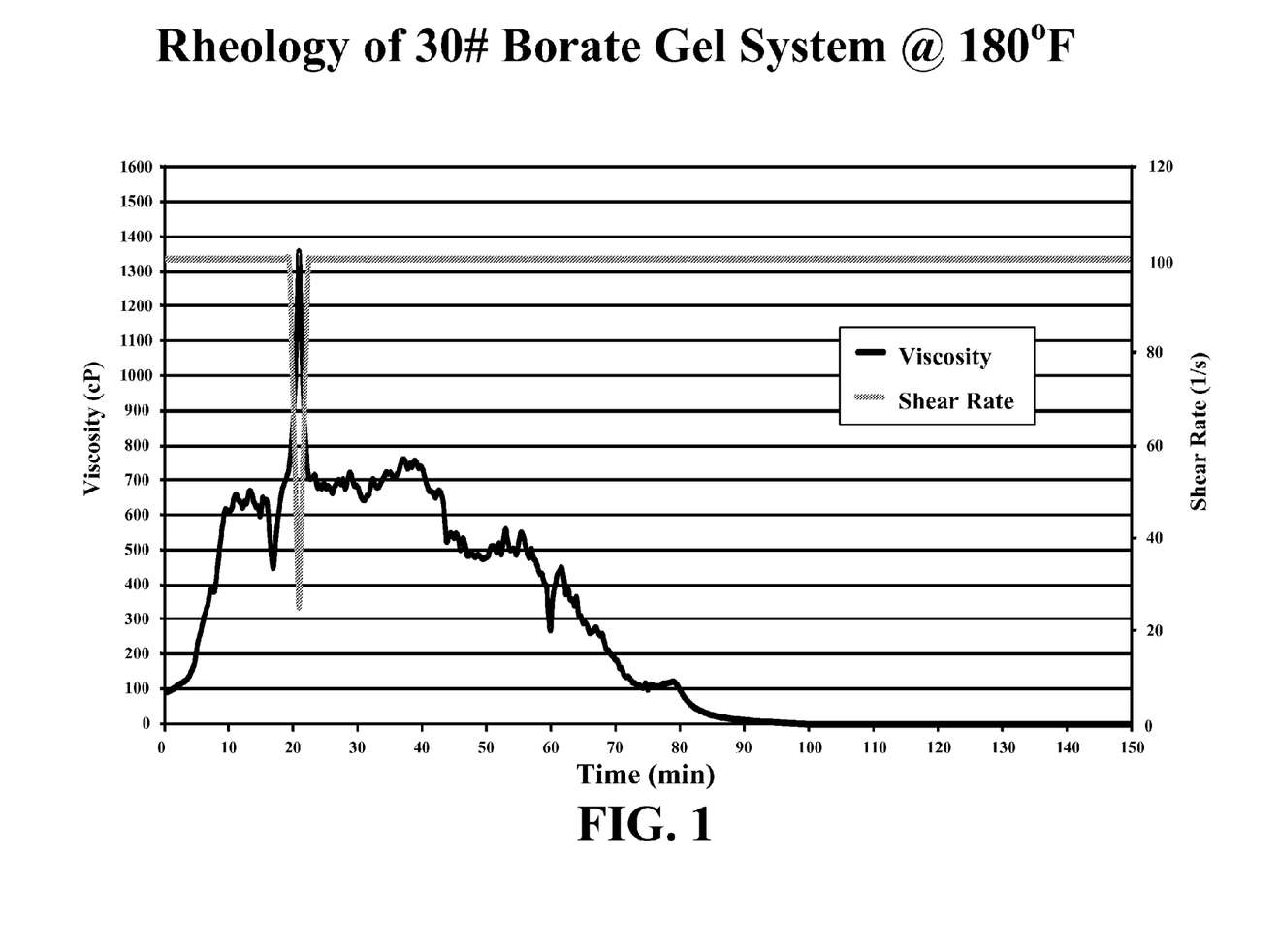
FIG. 1 depicts a plot of rheology date of a breaker system of this invention at a hold temperature of 180° F.

This example illustrates the rheology of a breaker composition of this invention used with a borate crosslinked fracturing fluid at 180° F.

The fracturing fluid includes a breaker composition comprising 12 gpt (gallons/1000 gallons) of WBK-145L, an oxidative breaker including a 10% w/w solution of sodium chlorite available from Clearwater International, LLC of Elmendorf, Tex., and 2 gpt of WBK-146L, a mixture of dimethyl glutariate, dimethyl succinate, and dimethyl adipate available from Clearwater International, LLC of Elmendorf, Tex. and a viscosifying composition including 1 gpt WXL-101L, a cross-linking agent including a mixture of colematite and ulexite available from Clearwater International, LLC of Elmendorf, Tex., and 0.9 gpt WXL-105L, a cross-linking agent comprising a borax solution available from Clearwater International, LLC of Elmendorf, Tex. and 2 gpt WGS-160L, a gel stabilizer available from Clearwater International, LLC of Elmendorf, Tex.

Example 2

Figure 2:
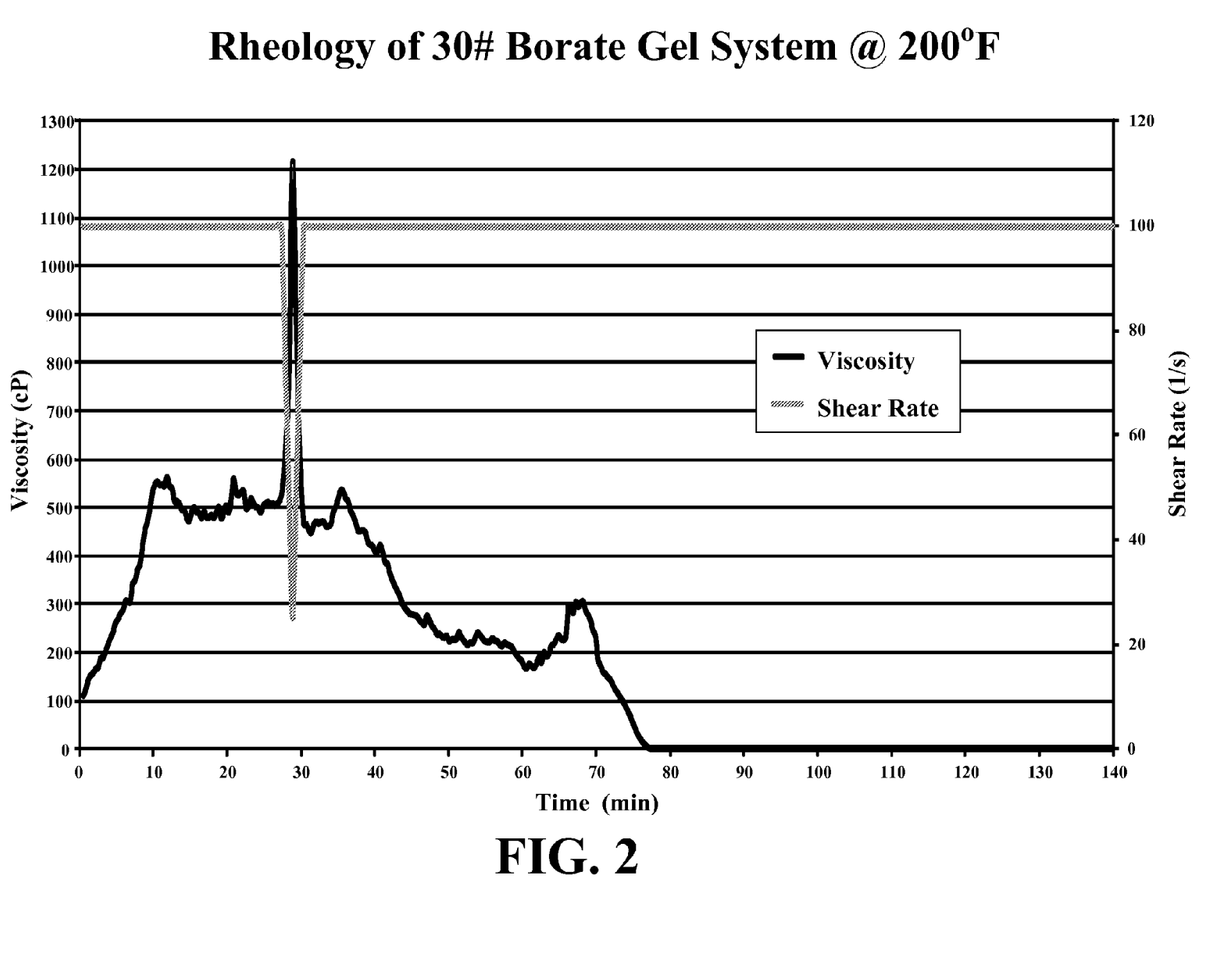
FIG. 2 depicts a plot of rheology date of a breaker system of this invention at a hold temperature of 200° F.

This example illustrates the rheology of a breaker composition of this invention used with a borate crosslinked fracturing fluid at 200° F.

The fracturing fluid includes a breaker composition comprising 12 gpt WBK-145L, an oxidative breaker including a 10% w/w solution of sodium chlorite available from Clearwater International, LLC of Elmendorf, Tex., and 1.4 gpt WBK-146L, a mixture of dimethyl glurarate, dimethyl succinate, and dimethyl adipate available from Clearwater International, LLC of Elmendorf, Tex. and a viscosifying composition including 1 gpt WXL-101L, a cross-linking agent including a mixture of colematite and ulexite available from Clearwater International, LLC of Elmendorf, Tex., 0.9 gpt WXL-105L, a cross-linking agent comprising a borax solution available from Clearwater International, LLC of Elmendorf, Tex., and 3 gpt WGS-160L, a gel stabilizer available from Clearwater International, LLC of Elmendorf, Tex.

Example 3

Figure 3:
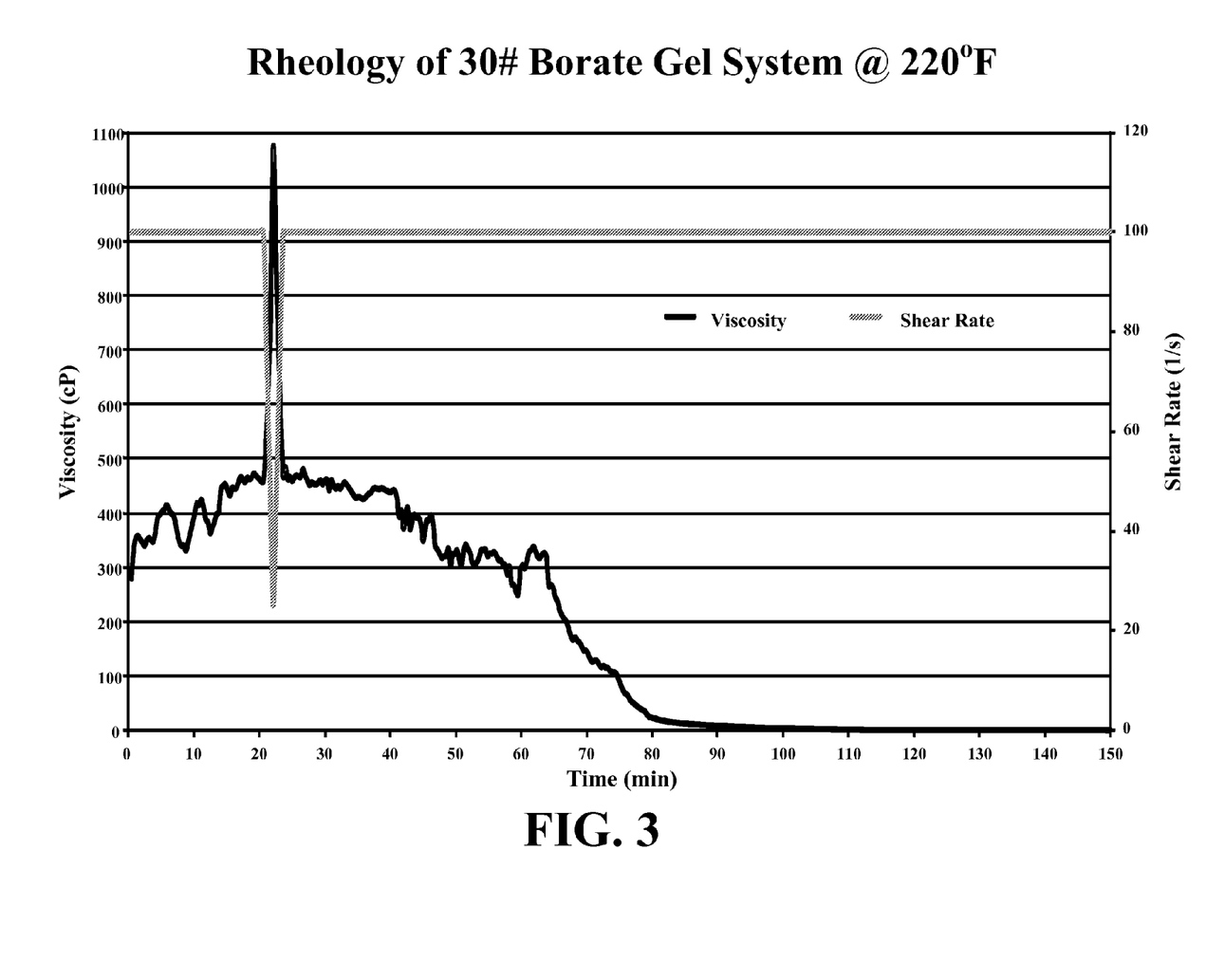
FIG. 3 depicts a plot of rheology date of a breaker system of this invention at a hold temperature of 220° F.

This example illustrates the rheology of a breaker composition of this invention used with a borate crosslinked fracturing fluid at 220° F.

The fracturing fluid includes a breaker composition comprising 12 gpt WBK-145L, an oxidative breaker including a 10% w/w solution of sodium chlorite available from Clearwater International, LLC of Elmendorf, Tex., and 1 gpt WBK-146L, a mixture of dimethyl glurarate, dimethyl succinate, and dimethyl adipate available from Clearwater International, LLC of Elmendorf, Tex. and a viscosifying composition including 1 gpt WXL-101L, a cross-linking agent including a mixture of colematite and ulexite available from Clearwater International, LLC of Elmendorf, Tex., 0.9 gpt WXL-105L, a cross-linking agent comprising a borax solution available from Clearwater International, LLC of Elmendorf, Tex., and 3 gpt WGS-160L, a gel stabilizer comprising an 85 wt. % solution of thiosulfate available from Clearwater International, LLC of Elmendorf, Tex.

All references cited herein are incorporated by reference. Although the invention has been disclosed with reference to its embodiments, from reading this description those of skill in the art may appreciate changes and modification that may be made which do not depart from the scope and spirit of the invention as described above and claimed hereafter.

We claim:

1. A method for stimulating a formation comprising:
    injecting, into a formation under fracturing condition, a fracturing fluid including:
        an oxidative component including an aqueous solution of an alkali metal chlorite or a plurality of alkali metal chlorites, in the absence or presence of an oxidative additive, and
        an ester component including one ester of a carboxylic acid or a mixture of esters of carboxylic acids,
    where the ester groups are carbyl group having 1 or 2 carbon atoms,
    where the carboxylic acids have between 2 and 20 carbon atoms where one or more of the carbon atoms can be replaced by an oxygen atom, and
    where a ratio of the oxidative component to the ester component is between about 4:1 and about 20:1 and is adjusted so that a breaking profile of a borate cross-linked fracturing fluid is substantially the same over a temperature range between about 100° F. and about 260° F. and the ratio is decreased as a temperature of the fracturing fluid increases,
    where for a borate cross-linked fracturing temperature of about 180° F., the ratio is between about 5:1 and about 8:1,
    where for a borate cross-linked fracturing temperature of about 200° F., the ratio is between about 8:1 and about 11:1, and
    wherein for a borate cross-linked fracturing temperature of about 220° F., the ratio is between about 11:1 and about 13:1.

2. The method of claim 1, wherein the aqueous solution of the alkali metal chlorites includes between about 0.5 wt. % and about 20 wt. % of the alkali metal chlorites in water.

3. The method of claim 1, wherein the aqueous solution of the alkali metal chlorites includes between about 5 wt. % and about 10 wt. % of the alkali metal chlorites in water.

4. The method of claim 1, wherein the alkali chlorites include lithium chlorite, sodium chlorite, potassium chlorite, rubidium chlorite, cesium chlorite or mixtures thereof.

5. The method of claim 2, wherein the oxidative component comprises an aqueous solution of including between about 5 wt. % and about 10 wt. % of sodium chlorite.

6. The method of claim 1, wherein the oxidative additive is selected from the group consisting of an alkali metal chlorate, an alkali metal chloride, and mixtures or combinations thereof, where the alkali metal includes lithium, sodium, potassium, rubidium, and/or cesium.

7. The method of claim 1, wherein the oxidative additive is selected from the group consisting of sodium chlorate, potassium chlorate, sodium chloride, potassium chloride, and mixtures or combinations thereof.

8. The method of claim 7, wherein the additive is present in an amount between about 0.5 wt. % and 15 wt. %.

9. The method of claim 1, wherein the carboxylic acids comprises linear or branched dicarboxylic acids.

10. The method of claim 9, wherein the dicarboxylic acids are linear dicarboxylic acids having between 3 and 20 carbon atoms.

11. The method of claim 9, wherein the dicarboxylic acids are linear dicarboxylic acids having between 4 and 10 carbon atoms.

12. The method of claim 1, wherein the ester component comprises an dicarbyl ester of a dicarboxylic acid or a mixture of dicarbyl esters of dicarboxylic acids.

13. The method of claim 1, wherein the esters component comprises an dialkyl ester of a dicarboxylic acid or a mixture of dialkyl esters of dicarboxylic acids, where the dicarboxylic acids include 3 to 8 carbon atoms and the alkyl groups include 1 to 2 carbon atoms.

14. The method of claim 1, wherein the ester component comprises a mixture of dialkyl esters of dicarboxylic acids, where the dicarboxylic acids include 4 to 6 carbon atoms and the alkyl groups include 1 to 2 carbon atoms.

15. A method for fracturing a formation comprising the steps of:
    injecting into a formation a borate cross-linked fracturing fluid comprising a cross-linkable gel, a borate cross-linking agent and an effective amount of a breaking composition,
    where the breaking composition comprises:
        an oxidative component comprising an aqueous solution of an alkali metal chlorite or a plurality of alkali metal chlorites, in the absence or presence of an oxidative additive, and
        an ester component comprising one diester of a dicarboxylic acid or a mixture of diesters of dicarboxylic acids, where the carboxylic acids have between 2 and 20 carbon atoms and the ester groups are carbyl group having 1 or 2 carbon atoms,
    where the effective amount comprises from about 1 gpt to about 20 gpt of the oxidative component and from about 0.1 gpt to about 5 gpt of the ester component,
    where the oxidative additive is selected from the group consisting of an alkali metal chlorate, an alkali metal chloride, and mixtures or combinations thereof, where the alkali metal includes lithium, sodium, potassium, rubidium, and/or cesium, and
    where a ratio of the oxidative component to the ester component is between about 4:1 and about and about 20:1 and is adjusted so that a breaking profile of a borate cross-linked fracturing fluid is substantially the same over a temperature range between about 100° F. and about 260° F. and the ratio is decreased as a temperature of the fracturing fluid increases,
    where for a borate cross-linked fracturing temperature of about 180° F., the ratio is between about 5:1 and about 8:1,
    where for a borate cross-linked fracturing temperature of about 200° F., the ratio is between about 8:1 and about 11:1, and
    wherein for a borate cross-linked fracturing temperature of about 220° F., the ratio is between about 11:1 and about 13:1.

16. The method of claim 15, wherein the effective amount is from about 1 gpt to about 18 gpt of the oxidative component and from about 0.1 gpt to about 5 gpt of the ester component.

17. The method of claim 15, wherein the effective amount is from about 4 gpt to about 16 gpt of the oxidative component and from about 0.5 gpt to about 4 gpt of the ester component.

18. The method of claim 15, wherein the effective amount is from about 8 gpt to about 14 gpt of the oxidative component and from about 0.5 gpt to about 3 gpt of the ester component.

19. The method of claim 15, wherein the effective amount is from about 8 gpt to about 14 gpt of the oxidative component and from about 0.5 gpt to about 2 gpt of the ester component.

20. The method of claim 1, wherein the ester component comprises a mixture of dimethyl glurarate, dimethyl succinate, and dimethyl adipate.

21. The method of claim 15, wherein the ester component comprises a mixture of dimethyl glurarate, dimethyl succinate, and dimethyl adipate.

* * * * *